United States Patent
Bhide et al.

(10) Patent No.: US 8,412,695 B2
(45) Date of Patent: Apr. 2, 2013

(54) METHOD AND SYSTEM FOR PROVIDING CONTEXT AWARE COMMUNICATION

(75) Inventors: Sudarshan Jayant Bhide, Maharashtra (IN); Sathya Narayanan Nagarajan, Tamilnadu (IN); Shikhar Porwal, Bonn (DE)

(73) Assignee: Infosys Technologies Limited (IN)

(*) Notice: Subject to any disclaimer, the term of this patent is extended or adjusted under 35 U.S.C. 154(b) by 142 days.

(21) Appl. No.: 12/785,603

(22) Filed: May 24, 2010

(65) Prior Publication Data

US 2011/0131221 A1 Jun. 2, 2011

(30) Foreign Application Priority Data

Nov. 30, 2009 (IN) .......................... 2937/CHE/2009

(51) Int. Cl.
*G06F 17/30* (2006.01)
(52) U.S. Cl. ........................................ 707/706; 707/736
(58) Field of Classification Search .................. 707/706, 707/736
See application file for complete search history.

(56) References Cited

U.S. PATENT DOCUMENTS

| | | | |
|---|---|---|---|
| 6,868,143 B1* | 3/2005 | Menon et al. | 379/88.13 |
| 7,664,740 B2* | 2/2010 | Starbuck et al. | 707/706 |
| 8,140,632 B1* | 3/2012 | Jablokov et al. | 709/206 |
| 2007/0088851 A1 | 4/2007 | Levkovitz et al. | |
| 2007/0299815 A1 | 12/2007 | Starbuck et al. | |
| 2008/0126481 A1* | 5/2008 | Chakra et al. | 709/204 |
| 2008/0139112 A1 | 6/2008 | Sampath et al. | |
| 2008/0243619 A1 | 10/2008 | Sharman et al. | |
| 2009/0106019 A1* | 4/2009 | Chen et al. | 704/9 |
| 2010/0041422 A1* | 2/2010 | Wormald et al. | 455/466 |

* cited by examiner

*Primary Examiner* — Hung Q Pham
(74) *Attorney, Agent, or Firm* — Cantor Colburn LLP (57) ABSTRACT

A method for processing a message received by a client device over a mobile communication network is provided. The method enables, firstly, applying one or more predetermined rules on the message. The one or more predetermined rules facilitate modifying the message by removing unwanted words therefrom. Secondly, the method enables matching keywords in the modified message with keywords stored in a keyword database to extract context from the message. Finally, the method enables rendering the extracted context on a user interface screen of the client device. The extracted context is customizable by a user.

9 Claims, 5 Drawing Sheets

METHOD AND SYSTEM FOR PROVIDING CONTEXT AWARE COMMUNICATION

FIELD OF THE INVENTION

The present invention relates to analyzing context of messages and providing relevant information based on the context and more specifically to provide a system and method for comprehending messages, extracting relevant context, and delivering relevant non intrusive targeted content to users of electronic communication device.

BACKGROUND OF THE INVENTION

With the advancement in telecommunication and information technology various modes of communication means have been employed to transfer content. Apart from voice messaging, various kinds of short messaging service (SMS) and multimedia messaging service (MMS) have been employed as a communication means amongst mobile users for person to person messaging, accessing information, and entertainment content from various web servers.

SMS has captured a significant market share in person-to-person messaging and is now increasingly being used for accessing information stored on the network of mobile communication operators. Even when the recipient mobile is switched off, or out of reach of the mobile network, the message is made available to the recipient when the recipient logs on to the network. The SMS and MMS messaging system is a store and forward messaging system. Also, the messages transferred between various users are not intelligent enough to generate dynamic rendering of different contents based on the context of the messages. There is not much which the users can do with the messages which are received or transferred from one user to another user in terms of context based searching. For example, if the users are transferring messages related to a particular activity and wishes that the messages which are transferred should also suggest various options available on the World Wide Web (WWW) related to a particular activity.

In light of the abovementioned disadvantages, there is a need for a system and method to analyze messages exchanged between various users, extract relevant context, and provide relevant information based on extracted context. In addition, there is a need for delivering relevant non intrusive targeted content to users of electronic communication device based on context of the messages.

SUMMARY OF THE INVENTION

A method for processing a message received by a client device over a mobile communication network is provided. The method comprises, firstly, applying one or more predetermined rules on the message. The one or more predetermined rules facilitate modifying the message by removing unwanted words therefrom. Secondly, the method comprises matching keywords in the modified message with keywords stored in a keyword database to extract context from the message. Finally, the method comprises rendering the extracted context on a user interface screen of the client device. The extracted context is customizable by a user.

In an embodiment of the present invention, the method further comprises facilitating a user to insert a keyword related to the message in the keyword database. In another embodiment of the present invention, the method further comprises retrieving web content when a user invokes a web search using the extracted context. In another embodiment of the present invention, the method further comprises, firstly, customizing the extracted context. Secondly, the method comprises retrieving web content when a user invokes a web search using the customized context.

In an embodiment of the present invention, applying one or more predetermined rules on the message comprises at least one of: eliminating words with letters less than or equal to four from the message or voice, eliminating numeric values from the message or voice, and applying auto text correction on the words in the message or voice. In another embodiment of the present invention, the method further comprises retrieving geographical location of the user employing at least one of: cell-identification (ID) of the client device and information from Global Positioning System (GPS) enabled client device. In an embodiment if the present invention, the method further comprises rendering the extracted context appended with location information of the user on the user interface screen of the client device.

In an embodiment of the present invention, a method for processing a message received by a client device over a mobile communication network is provided. The method comprises, firstly, applying one or more predetermined rules on the message. The one or more predetermined rules facilitate modifying the message by removing unwanted words therefrom. Secondly, the method comprises matching keywords in the modified message with keywords stored in a keyword database to extract context from the message. The method further comprises rendering the extracted context on a user interface screen of the client device. The extracted context is customizable by a user. Finally, the method comprises retrieving web content when a user invokes a web search using the extracted context.

A client device for processing a message received over a mobile communication network is provided. The client device comprises a keyword database configured to store keywords related to the message. The client device further comprises a context extractor module configured to extract context from the message by matching words in the message with keywords stored in the keyword database. The context extractor module comprises a rule processing module configured to store one or more predetermined rules. The one or more predetermined rules are adapted to be applied on the message in order to modify the message by removing unwanted words therefrom.

In an embodiment of the present invention, the client device further comprises a processor module configured to facilitate the user to dynamically insert a keyword in the keyword database. The processor module further facilitates the user to invoke a web search based on the extracted context. The extracted context is customizable by the user.

In an embodiment of the present invention, the client device further comprises a web-based search module configured to retrieve web content related to at least one of: the extracted context and customized context from a backend web-based server. The client device communicates with the backend web-based server over a telecommunication network. In another embodiment of the present invention, the web content includes at least one of: web pages, RSS feeds, and Atom based feeds. In an embodiment of the present invention, the keywords are pre-stored in the keyword database.

A client device for processing a message received over a mobile communication network is provided. The client device comprises a keyword database configured to store keywords related to the message. The client device further comprises a context extractor module configured to extract context from the message by matching words in the message with keywords stored in the keyword database. The context extractor module comprises a rule processing module configured to store one or more predetermined rules. The one or more predetermined rules are adapted to be applied on the message in order to modify the message by removing unwanted words therefrom. Furthermore, the client device comprises a processor module configured to facilitate the user to invoke a web search based on the extracted context. The extracted context is customizable by the user.

The present invention is described by way of embodiments illustrated in the accompanying drawings wherein.

BRIEF DESCRIPTION OF THE
ACCOMPANYING DRAWINGS

DETAILED DESCRIPTION OF THE INVENTION

A method and system for providing context aware communication is described herein. The invention provides for a method and system that enables to analyze context of conversation between users. The conversation may be via various communication services, such as, SMS and MMS. Further, the invention facilitates the user to retrieve information, such as web search results, effectively based on the context thereby enhancing user experience.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
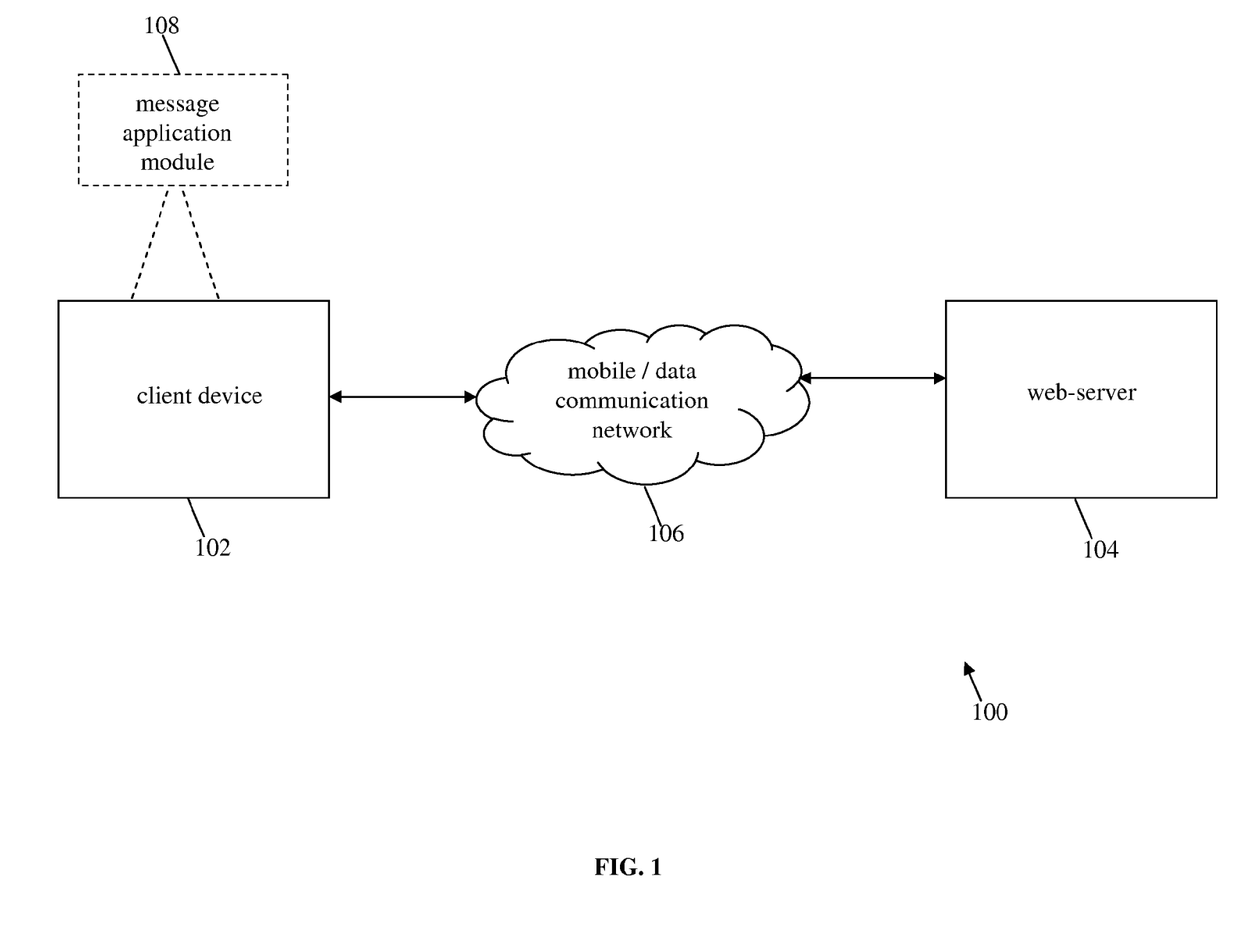
FIG. 1 is a block diagram of a system that facilitates context aware communication in accordance with an embodiment of the present invention.

FIG. 1 is a block diagram illustrating a system 100 that facilitates context aware communication in accordance with an embodiment of the present invention. In various embodiments of the present invention, the system 100 comprises a client device 102 and a web-server 104. In another embodiment of the present invention, the web-server 104 may be integrated with a third-party server such as an advertisement platform. The client device 102 communicates with the web-server 104 over a mobile or data communication network 106 such as an internet. The client device 102 further comprises a message application module 108.

The client device 102 is an electronic communication device which may be used by one or more users to communicate with each other over the mobile communication network. In various embodiments of the present invention, the client device 102 may be a wireless/handheld device which users use to communicate via various communication services such as SMS and MMS. Examples of client device 102 include mobile phones, personal digital assistants, portable telephones, wired telephones, internet appliances, personal communication systems etc. The message application module 108 in the client device 102 facilitates to extract the context of incoming message and display the same on the client device 102. The message application module 108 further facilitates the user of the client device 102 to invoke a web search using the extracted context to retrieve desired search results. In an embodiment of the present invention, the web search may be invoked using the web-server 104.

Web-server 104 is an entity hosting an application or computer program for processing web service requests made by the client device 102. In various embodiments of the present invention, the web-server 104 facilitates searching of information on the World Wide Web and transmitting the search results to the client device 102 over the mobile or data communication network 106. In another embodiment of the present invention, the web-server 104 may be integrated with a third-party server, such as, an advertisement platform to facilitate transmission of web search results along with relevant advertisements to the client device 102 over the mobile or data communication network 106.

Mobile or data communication network 106 is a telecommunication network via which various user terminals communicate with each other using communication standards. Examples of mobile communication standards include, but are not limited to, Global System for Mobile communication (GSM), Code Division Multiple Access (CDMA) or any other mobile telephony standards. Examples of data communication network include internet or any other network connecting computer networks. In various embodiments of the present invention, the client device 102 interacts with the web-server 104 over the mobile or data communication network 106 to retrieve web search results or advertisements. The web search results or advertisements are relevant to the context of conversation of the incoming message as analyzed by the message application module 108.

Figure 2:
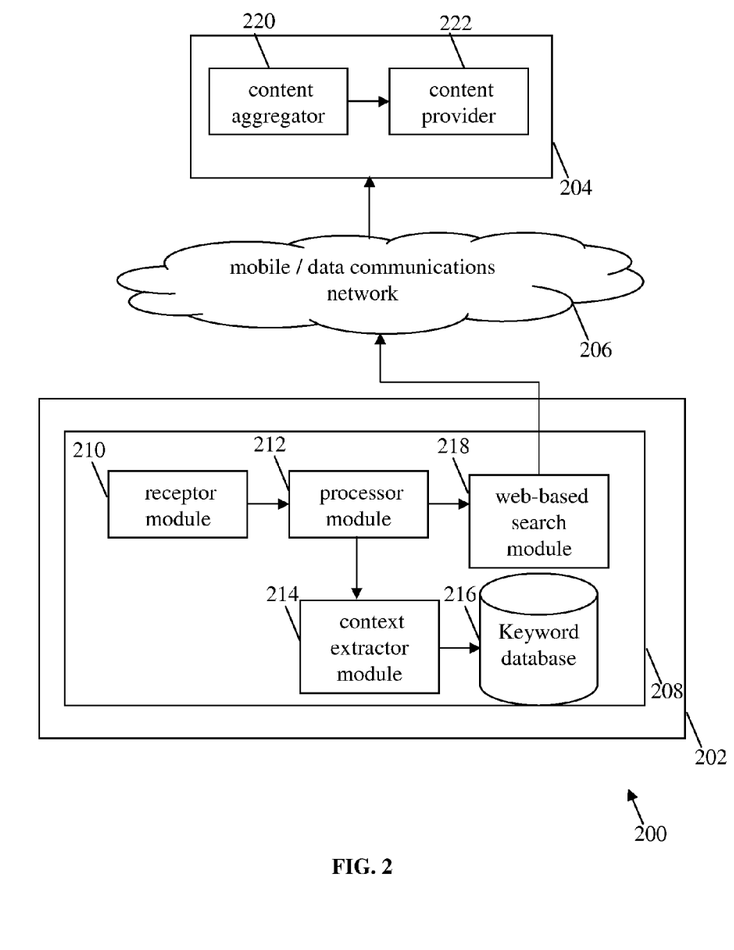
FIG. 2 illustrates a detailed block diagram of the system that facilitates context aware communication in accordance with an embodiment of the present invention.

FIG. 2 illustrates a detailed block diagram of the system 200 that facilitates context aware communication in accordance with an embodiment of the present invention. The system comprises a client device 202 that communicates with a web-server 204 over a mobile or data communication network 206. The client device 202 comprises a message module 208 which further comprises a receptor module 210, a processor module 212 and a web-based search module 218. The processor module 212 operates in conjunction with a context extractor module 214 which further operates in conjunction with a keyword database 216.

The receptor module 210 is a telecommunication module that facilitates reception of incoming message in the client device 202. Examples of message include, SMS and MMS. In an embodiment of the present invention, the receptor module 210 alerts the user of the incoming SMS by means of a notification icon which is rendered on the user interface screen of the client device 202. In another embodiment of the present invention, the notification can be enabled by a vibrator or speaker module of the client device 202. Further, the receptor module 210 stores the SMS in a database (not shown).

In another embodiment of the present invention, context may also be extracted from an incoming voice call/message. In case of voice call/message, a voice to text converter (not shown) converts the received voice to text for further processing. The voice to text converter is a software module which may reside within or outside the receptor module 210. Examples of voice to text converter may be conventional software's such as Dragon Systems dragon dictate or IBM's VoiceType dictation, Voxette, IBM Viva Voice, Windows Speech Synthesizer that selects appropriate words after comparing the acoustic words in a stored voice profile with a language model or any other solution that implements voice to text conversion. The voice to text converter further defines the selected words in a text format such as American Standard Code for Information Interchange (ASCII) or any other suitable text format. The receptor module 210 transmits the received message/converted text to the processor module 212.

The processor module 212 is a computing device which enables processing of the received message in the client device 202. In various embodiments of the present invention, the processor module 212 facilitates display of the SMSs stored in the database (not shown) to enable the user to select an SMS from the list of SMSs which are displayed. In an embodiment of the present invention, the processor module 212 operates in conjunction with the context extractor module 214 and displays the extracted context on the user interface screen of the client device 202. The processor module 212 also facilitates the user to customize the extracted context that is displayed on the user interface screen of the client device 202. The processor module 212 also facilitates the user to configure the keyword database 216 by adding a keyword in the keyword database 216. The processor module 212 further operates in conjuction with the web-based search module 218 to facilitate the user to query on the extracted context or the customized context.

Context extractor module 214 is a software module which operates in conjunction with the processor module 212 to facilitate extraction of context from the received message and renders the extracted context on the client device 202. In an embodiment of the present invention, the context extractor module 214 intelligently extracts keywords from the SMS by analyzing it based on one or more predetermined rules. In yet another embodiment of the present invention, the context from the SMS is extracted by matching words in the analyzed SMS with keywords stored in the keyword database 216. In an example, the keyword database 216 may be a lexicon database which facilitates the context extractor module 214 to access a data structure stored therein to determine a keyword that most likely corresponds to the SMS. The contents extracted by the content extractor 214 can be used to invoke a web search using the web-based search module 218.

The web-based search module 218 is a software module which facilitates the user to initiate a web search using the context that is extracted or the customized extracted context and retrieves related information from web. In various embodiments of the present invention, the web-based search module 218 invokes the web-server 204 with the extracted or customized context to retrieve web search results. In an embodiment of the present invention, the web-based search module 218 receives, parses, and displays web feeds obtained from the web-server 204. Web feed is a data format which facilitates the users to receive frequently updated content.

The web-server 204 further comprises a content aggregator 220 and a content provider 222. The content aggregator 220 is an entity that combines data from different web sources into an integrated web application. Thus, the content aggregator 220 provides the users access to contents from multiple web data sources. In various embodiments of the present invention, the content aggregator 220 aggregates content from different content providers 222 and provides the content as web feeds, such as, Really Simple Sindication (RSS) feeds for processing by the web-based search module 218. In an exemplary embodiment, the content aggregator 220 may be a data mashup tool (e.g. yahoo!pipes) that provides a graphical user interface for building data mashups. The data mashups aggregate web feeds, web pages, and other services, creating web-based applications from various content providers. Further, the data mashups facilitates publishing of the web applications.

The content provider 222 is an entity which facilitates searching of information on the World Wide Web. In various embodiments of the present invention, the content provider 222 comprises various search engines using which content can be retrieved from the World Wide Web to deliver search results on the client device 202. Examples of search engine include, but are not limited to, Google, Yahoo etc.

Figure 3:
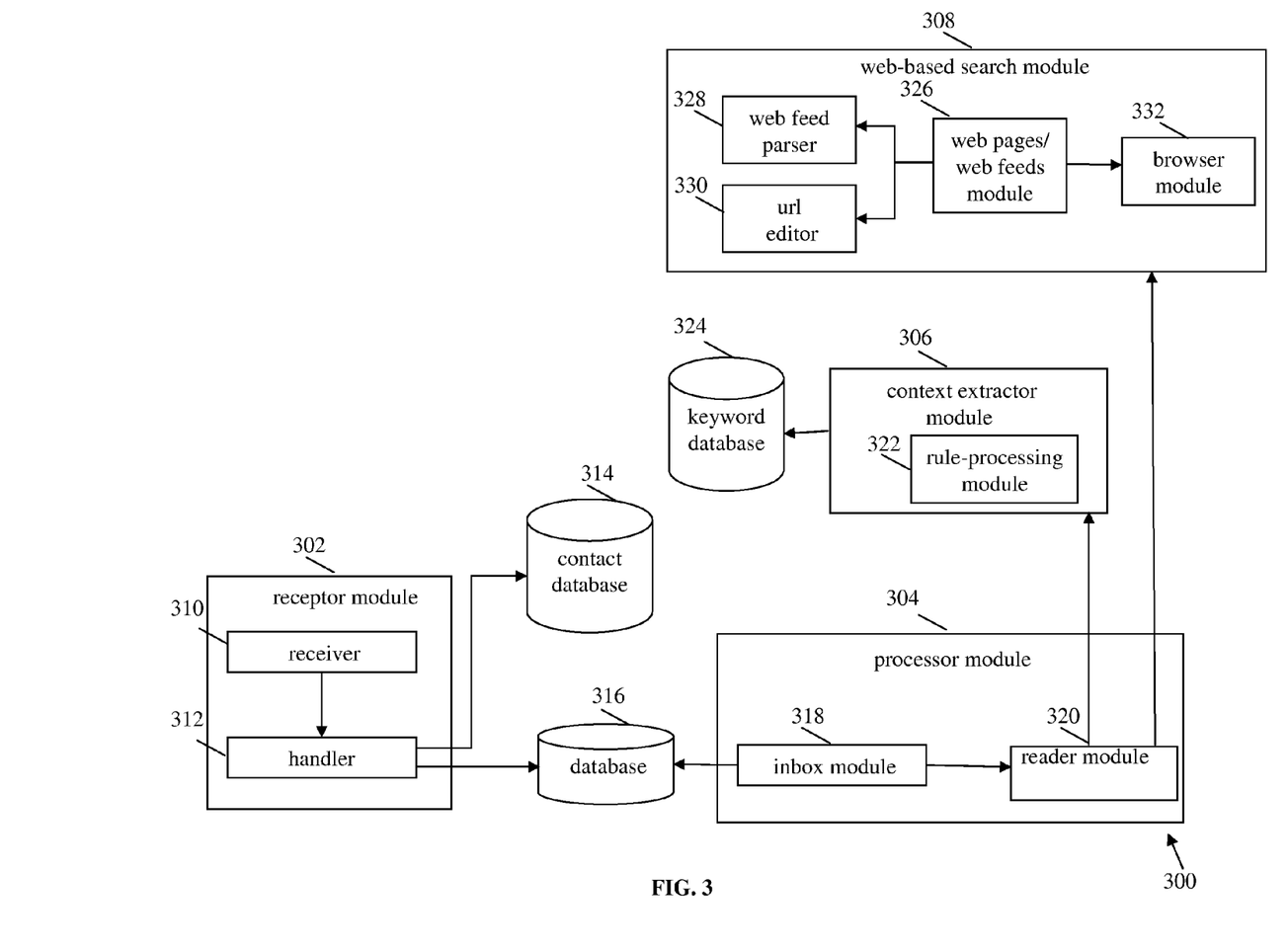
FIG. 3 illustrates a detailed block diagram of an application module in accordance with an embodiment of the present invention.

FIG. 3 illustrates a detailed diagram of the message application module in a messaging environment in accordance with an embodiment of the present invention. The receptor module 302 comprises a receiver 310 and a handler 312. The receiver 310 is a telecommunication module that facilitates reception of SMS transmitted by a service provider. In various embodiments of the present invention, the receiver 310 receives the SMS and extracts contents from the SMS. Examples of contents extracted from SMS may include, but are not limited to, 'header specifying details of the sender, e.g. sender's name, sender's phone number etc.', and 'a message body containing complete message'. Further, a time stamp may also be calculated denoting the date/time at which the SMS is received. Thereafter, the receiver 310 invokes the handler 312 and passes the SMS to the handler 312.

The handler 312 is a software module which performs SMS handling and facilitates the user of the client device 202 (FIG. 2) to be notified of an incoming SMS for commencing the context extraction process. In an embodiment of the present invention, the handler 312 provides a non-intrusive short notification icon or alert on the user interface screen of the client device 202 (FIG. 2) which indicates receipt of the SMS to the user. For instance, the notification icon may embody name or phone number (e.g. Mobile Subscriber Integrated Services Digital Network Number (MSISDN)) of the sender of the SMS and the message body of the SMS. In an example, the handler 312 uses information stored in a contact database 314 to display the notification icon. The contact database 314 may contain sender information such as name, contact number etc. The handler 312 extracts logical information, such as the MSISDN, from the incoming SMS and maps the same with the information stored in the contact database 314. Thereafter, the handler 312 retrieves the sender information and displays the same on the user interface screen of the client device 202 (FIG. 2). Further, the handler 312 stores the received SMS in a database 316.

The processor module 304 comprises an inbox module 318, and a reader module 320. In various embodiments of the present invention, the inbox module 318, when activated by the user, fetches the SMSs stored in the database 316. The inbox module 318 displays a list of the SMSs on the user interface screen. The user can select a particular SMS from the list to read the complete SMS.

The reader module 320 is invoked when the user selects a particular SMS. The reader module 320 displays the complete SMS selected by the user. In an embodiment of the present invention, the reader module 320 enables display of the context which is extracted by the context extractor module 306. In another embodiment of the present invention, the reader module 320 provides a context editor functionality which facilitates the user to edit the extracted context. In yet another embodiment of the present invention, the reader module 320 facilitates improvisations of the context using a most recently used list of contexts, information related to the sender of the SMS etc. In yet another embodiment of the present invention, the reader module 320 prompts the user to trigger a web search using the extracted context. In an embodiment of the present invention, the reader module 320 also facilitates caching of search results that are retrieved by the web search module 308.

The context extractor module 306 is configured to extract keywords out of message body of the SMS, identifying the context and rendering the extracted context on the client device 202. In an embodiment of the present invention, the number of words that can be extracted from the SMS may be configured. For example, the number of words that can be extracted from the SMS may be configured to be three. In an embodiment of the present invention, the context extractor module 306 comprises interfaces that are generic and pluggable for usage. For example, the context extractor module 306 can be made pluggable with any third party application such as an advertisement platform to infer the context and provide relevant advertisements to the user. In an embodiment of the present invention, the context extractor module 306 comprises a rule-processing module 322.

The rule-processing module 322 is a software module which comprises a set of predetermined logic rules. The rule-processing module 322 may reside as a program file in the context extractor module 306 wherein the rules may be configured dynamically. The predetermined rules are applied on the SMS for extracting context i.e. keywords from the SMS In another embodiment of the present invention, application of rules may result in filtering unwanted text. For example, ignoring words in the SMS, which are less than or equal to four letters as short words are generally not meaningful. Further, numbers contained in the SMS may be ignored. Furthermore, if words in the SMS contain alphanumeric values, then each word is checked for possible spelling mistakes using Auto Text Application Programming Interface (API). Auto Text is a software which facilitates automatic text correction e.g. T9 dictionary. If Auto Text returns any valid word, then that word may be used. If a valid word is not returned, the alphanumeric word may be discarded. Further, for normal words too, possible spelling mistakes may be checked using AutoText feature.

In various embodiments of the present invention, the context extractor module 306 uses a keyword database 324 for extracting keywords from the SMS. In particular, after applying the predetermined rules to the SMS, the context extractor module 306 extracts keywords from the SMS for rendering on the client device 202 (FIG. 2) by performing a keyword match with the keywords stored in the keyword database 324. The keyword Database 324 is pre-stored with frequently used words in SMS. Examples of the keywords may include, but are not limited to, pizza, movie, shop, mall, food, match, tennis, sports, bank, finance etc. In another embodiment of the present invention, the processor module 304 also facilitates the user to dynamically configure the keyword database 324 by inserting a keyword in the keyword database 324. In an embodiment of the present invention, the keywords may be stored using a mobile device database, such as, SQLite.

In various embodiments of the present invention, the extracted context is rendered along with geographical location information of the user. Location of the user can be retrieved using multiple ways. In an embodiment of the present invention, if the client device 202 is Global Positioning System (GPS) enabled, the latitude and longitude of the client device 202 can be retrieved directly. In yet another embodiment of the present invention, if the client device 202 is not GPS enabled, the cell-id of the client device 202 (when the client device 202 is a mobile phone) can be used to retrieve the location of the user.

In another embodiment of the present invention, the context extractor module 306 uses profile information of the user to understand the user's requirement (preferences) and customize the context suitably thereby enhancing the context. For example, user's age may be used as another parameter for extracting the context. The profile information of the user may comprise demographic details such as race, age, etc. and web search results of the user. The profile information of the user can be retrieved from the user's service provider or can be stored in a user profile database (not shown) in the web-based server 204 (FIG. 2). In an embodiment of the present invention, the context extractor module 306 facilitates rendering of highlighted context onto the reader module 320 for the user to make subsequent backend queries using the web-based search module 308.

The web-based search module 308 comprises a web page or web feed module 326, a web feed parser 328, a Uniform Resource Locator (URL) editor 330 and a browser module 332. In various embodiments of the present invention, the web-based search module 308 is a software module that invokes the web-server 204 (FIG. 2) to retrieve relevant search results based on the user's query (i.e. the extracted and customized context).

The web page module or web feed module 326 is a software module that invokes the web-server 204 (FIG. 2) and retrieves content from the web-server 204 when the user triggers a web search based on the extracted context. Further, if the user edits the extracted keywords, the web search is triggered based on the edited context.

The web feed parser 328 is a software module that parses the content retrieved by the web page module or web feed module 326 for displaying articles associated with the web feed. In an embodiment of the present invention, the web feed parser 328 may be a RSS parser which analyzes the content received as RSS feeds from the content providers (e.g. yahoo. Google etc.) for display. In another embodiment of the present invention, the web feed may be Atom based.

The URL editor 330 maintains a list of URL's associated with the articles received as search results and facilitates the user to click onto the URL of the selected article for reading.

The browser module 332 is a software module which facilitates display of the article selected from the content retrieved. Examples, of browser may be mobile device browsers, such as, Opera Mini, safari, Skyfire. In various embodiments of the present invention, the user can browse through the articles using in-built browser support.

Figure 4:
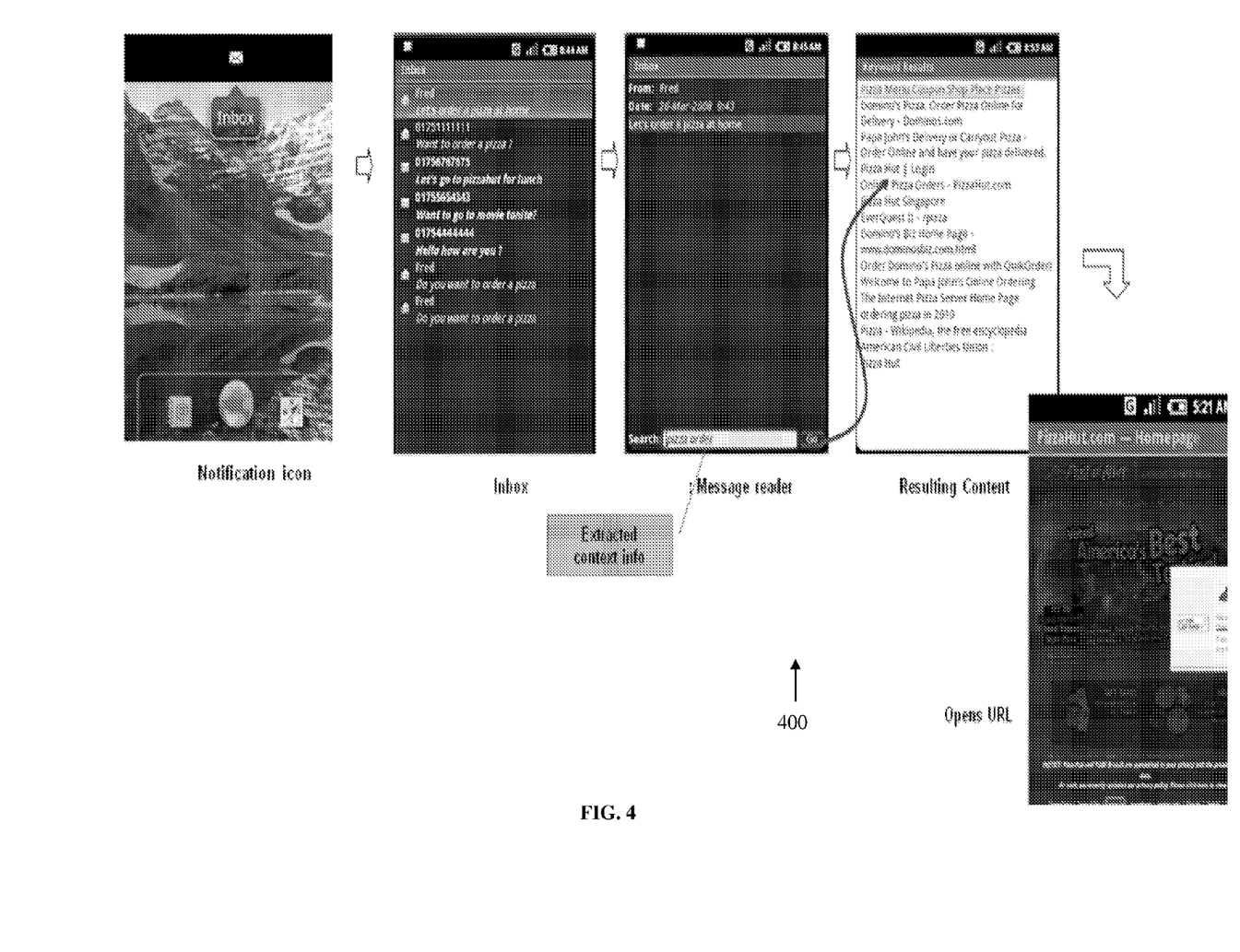
FIG. 4 is a screenshot of a user interface portion of the client device that illustrates content extraction from SMS in accordance with an embodiment of the present invention.

FIG. 4 is a screen shot of a user interface portion of the client device 202 that illustrates context extraction from SMS in accordance with an embodiment of the present invention.

When SMS is received by the client device 202, such as a mobile device, a notification icon is displayed which indicates receipt of the SMS. When user clicks onto the notification icon, the inbox module is launched. The inbox module facilitates display of a preview of the SMS which is received and all other SMS received previously. In this example, the SMS received by the client device is "Let's order a pizza at home". As shown in FIG. 4, when the user selects this SMS, the complete SMS is displayed to the user via the reader module. Further, the context "pizza order" is extracted and displayed in a search text box on the user interface screen of the mobile device. Based on the extracted context, the user can trigger a web search to retrieve relevant search results by pressing 'Go' button on the user interface screen of the mobile device. Subsequently, content is received based on the search query and the user may view the content by clicking a particular URL from a list of URLs.

Further, the user can also edit the extracted context and invoke web search. Also, location information of the user is extracted. In particular, in this example, when the SMS is:

"Let's order a pizza"

Context="order pizza"+user's location

Customized context="order pizza hut"+san francisco, CA 94114

Action=ordering a pizza at CA 94114

Applying location (latitude/longitude) information with the extracted context from the above SMS facilitates the user to identify the nearest pizza store location.

Figure 5:
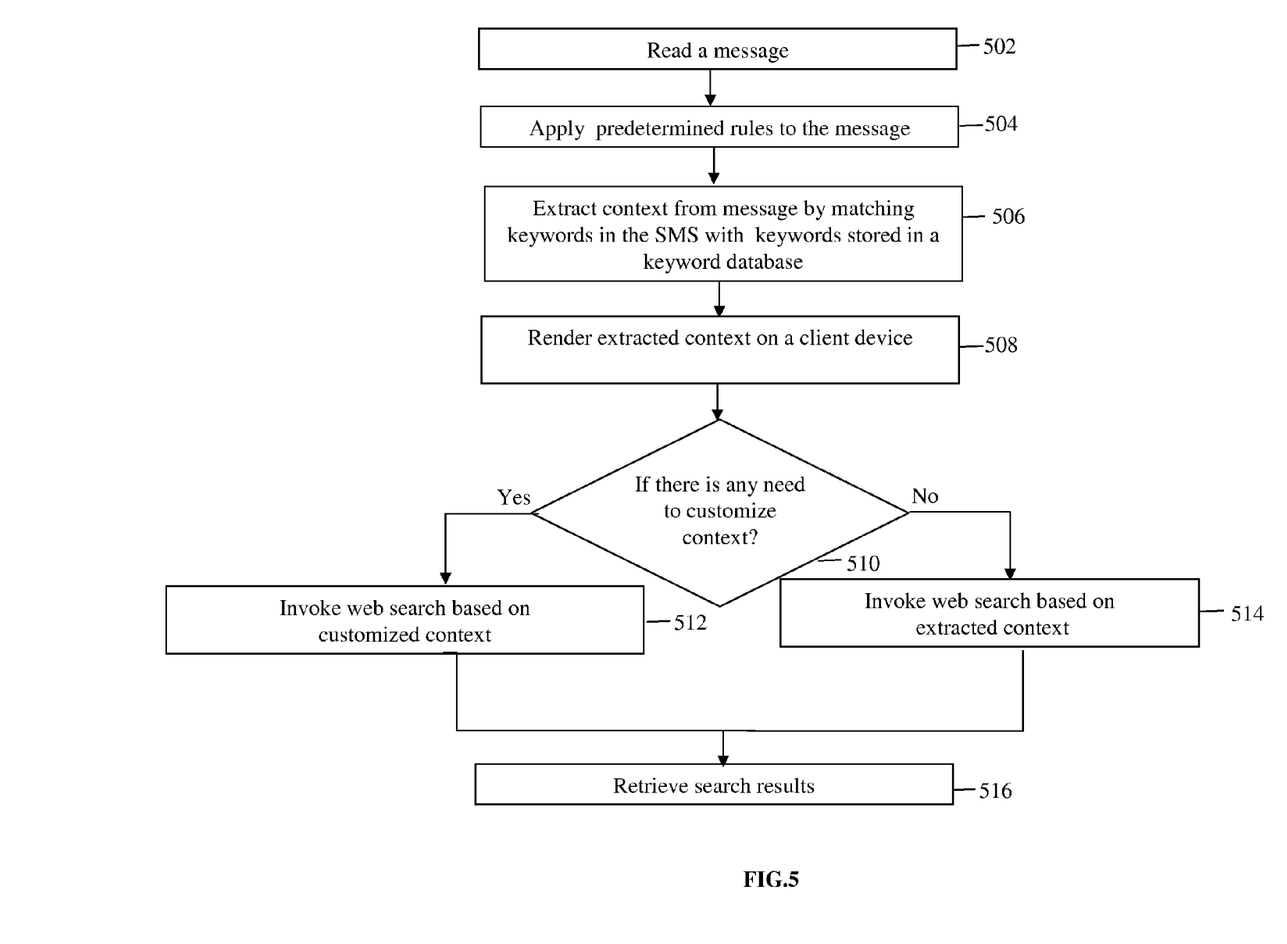
FIG. 5 is a flowchart illustrating a method for extracting context from message for retrieving relevant search results in accordance with an embodiment of the present invention.

FIG. 5 is a flowchart illustrating a method for extracting context from message for retrieving relevant search results in accordance with an embodiment of the present invention.

At step 502 a message is read. In various embodiments of the present invention, the message, such as, SMS is received by a client device. The receipt of message is notified on a user interface screen of the client device. Activation of a reader module in the client device facilitates the user to read the SMS.

At step 504, predetermined rules are applied to the message. In various embodiments of the present invention, the context extraction module applies rules on the SMS using a rule processing module to facilitate efficient extraction of context from the SMS by filtering unwanted text. In an embodiment of the present invention, words in the SMS, which are less than or equal to four letters are ignored as short words and may not be meaningful. For example, if the SMS received is "Lets order a pizza", words such as 'lets' and 'a' are removed. In another embodiment of the present invention, numeric values present in the SMS are removed. For example, if the SMS reads "Lets order 2 pizzas", the number '2' is removed.

In yet another embodiment of the present invention, if words in the SMS contain alphanumeric values, then each word is checked for possible spelling mistakes using Auto Text Application Programming Interface (API). If Auto Text returns any valid word, then that word may be used. If a valid word is not returned, the alphanumeric word may be discarded. Further, for normal words too, possible spelling mistakes may be checked using AutoText feature. If Auto Text returns any valid word, then that word may be used At step 506, context is extracted from the message by matching keywords in the SMS with keywords stored in a keyword database. In various embodiments of the present invention, the context extractor module uses the keyword database for extracting keywords from the SMS. After applying the predetermined rules to the SMS, the context extractor module extracts keywords from the SMS by performing a keyword match with the keywords stored in the keyword database. For example, "order pizza" may be extracted from the SMS "Lets order a pizza". In another embodiment of the present invention, location information of the user may be retrieved from the cell-id of the user. Alternately, if the client device is GPS enabled, latitude, longitude information of the client device may be retrieved directly.

At step 508, the extracted context is rendered on a client device. In various embodiments of the present invention, the context extractor module facilitates rendering of the extracted context on the client device. For example, "order pizza" may be rendered on the user interface screen of the client device. In another embodiment, extracted context may be rendered along with location information appended to it. For example, "order pizza"+"San Francisco, Calif. 94114".

At step 510, a check is performed to determine if there is any need to customize the context. In various embodiments of the present invention, the user is prompted to customize the rendered context. This would facilitate the user to modify the context which is extracted and rendered.

If there is a need to customize the context, then, at step 512, web search is invoked based on the customized context. In various embodiments of the present invention, the user edits the extracted context. For example, if the rendered context is "order pizza", the user may modify it to "order dominos". Thereafter, the user invokes a web search for searching information on "order dominos". In another embodiment of the present invention, the location information appended may facilitate the user to conduct local search. In such a case, the action would be to search for dominos in San Francisco.

If the context is not customized, then, at step 514, web search is invoked based on the extracted context. In various embodiments of the present invention, if the user does not intend to modify the extracted context, the user may invoke a web search using the extracted context i.e. "order pizza"

At step 516, search results are retrieved. In various embodiments of the present invention, search results are obtained in the form of URL and the user can click and navigate according to his needs. In an embodiment of the present invention, search results are obtained as web feeds (e.g. RSS, Atom feeds etc.) which the user can view using a browser module such as etc. The search results are provided by a web-server which is configured to aggregate content from multiple sources such as (Yahoo, Google, MSN etc.) and render content as RSS feeds. A web-based search module in the client device is capable of receiving, parsing and displaying the RSS outputs to the user.

The present invention may be implemented in numerous ways including as a apparatus, method, or a computer program product such as a computer readable storage medium or a computer network wherein programming instructions are communicated from a remote location. Further, the present invention can be implemented as software that can be embedded in the client device, such as, a mobile device at the point of manufacture. Furthermore, the software may also be downloaded on the client device from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A method for processing a message received by a client device over a mobile communication network, the method comprising:

retrieving the received message stored in a database within the client device of a user and analyzing the retrieved message at the client device based on one or more predetermined rules to remove unwanted words from the retrieved message;

matching keywords in the analyzed message with keywords stored in a keyword database within the client device and combining the matched keywords with the user's profile to extract context from the analyzed message;

rendering the received message in an unaltered form in a first display area of a user interface screen of the client device and rendering the extracted context on a second display area of the user interface screen in response to a message read request invoked by the user, wherein the extracted context is customized by the user; and retrieving multiple web contents in response to a web search invoked by the user using the customized context, wherein the retrieved multiple web contents are displayed in a third display area of the user interface screen to facilitate the user to select one or more web contents from the displayed multiple web contents.

2. The method of claim 1 further comprising facilitating the user to insert a keyword related to the received message in the keyword database.

3. The method of claim 1, wherein analyzing one or more predetermined rules on the message comprises at least one of:

eliminating words with letters less than or equal to four from the retrieved message, eliminating numeric values from the retrieved message, and applying auto text correction on the words in the retrieved message.

4. The method of claim 1 further comprising retrieving geographical location of the user by dynamically employing at least one of: cell-identification (ID) of the client device and information from Global Positioning System (GPS) enabled client device.

5. The method of claim 4 further comprising:

rendering the extracted context appended with location information of the user on the second display area of the user interface screen of the client device.

6. A client device comprising:

a processor;

a memory embedded with computer instructions, wherein the computer instructions are executed by the processor to perform steps comprising:

retrieving the received message stored in a database within the client device of a user and analyzing the retrieved message at the client device based on one or more predetermined rules to remove unwanted words from the retrieved message;

matching keywords in the analyzed message with keywords stored in a keyword database within the client device and combining the matched keywords with the user's profile to extract context from the analyzed message;

rendering the received message in an unaltered form in a first display area of a user interface screen of the client device and rendering the extracted context on a second display area of the user interface screen in response to a message read request invoked by a user, wherein the extracted context is customized by the user; and retrieving multiple web contents in response to a web search invoked by the user using the customized context, wherein the retrieved multiple web contents are displayed in a third display area of the user interface screen to facilitate the user to select one or more web contents from the displayed multiple web contents.

7. The client device of claim 6, wherein the embedded computer instructions further executed by the processor for:

facilitating the user to dynamically insert one or more keywords in the keyword database.

8. The client device of claim 6, wherein the embedded computer instructions further executed by the processor for retrieving multiple web contents related to at least one of the extracted context and customized context from a backend web-based server, wherein the client device communicates with the backend web-based server over a telecommunication network.

9. The client device of claim 8, wherein the multiple web content include at least one of: web pages, RSS feeds, and Atom based feeds.

* * * * *